(12) United States Patent
Imura (10) Patent No.: US 7,710,559 B2
(45) Date of Patent: May 4, 2010

(54) CALIBRATION REFERENCE LIGHT SOURCE AND CALIBRATION SYSTEM USING THE SAME

(75) Inventor: Kenji Imura, Toyohashi (JP)

(73) Assignee: Konica Minolta Sensing, Inc., Osaka (JP)

( * ) Notice: Subject to any disclaimer, the term of this patent is extended or adjusted under 35 U.S.C. 154(b) by 63 days.

(21) Appl. No.: 12/229,171

(22) Filed: Aug. 20, 2008

(65) Prior Publication Data

US 2009/0051910 A1  Feb. 26, 2009

(30) Foreign Application Priority Data

Aug. 24, 2007  (JP) .............................. 2007-218791

(51) Int. Cl.
*G01J 3/02* (2006.01)
(52) U.S. Cl. ................................. 356/243.8; 356/243.1
(58) Field of Classification Search ................. 356/326, 356/328, 243.1, 243.8
See application file for complete search history.

(56) References Cited

U.S. PATENT DOCUMENTS 7,339,665 B2  3/2008  Imura 7,365,328 B2 *  4/2008  Busch et al. ........... 250/339.09

FOREIGN PATENT DOCUMENTS

JP  2006-177785  7/2006

* cited by examiner

*Primary Examiner*—L. G Lauchman
(74) *Attorney, Agent, or Firm*—Brinks Hofer Gilson & Lione (57) ABSTRACT

In a calibration reference light source and a sensitivity calibration system using the same, a plurality of single-wavelength light sources for emitting reference lights having mutually different single-wavelengths are used instead of a black body radiation source for radiating a white light, and not only the intensities of the single-wavelength reference lights, but also the wavelengths thereof are measured to obtain sensitivity correction coefficients of intensity-to-radiance conversion data. Thus, obtained reference radiance are highly reliable and sensitivity correction of spectrophotometers and spectral illuminometers can be performed with high accuracy and reliability at a user side, whereby the calibration reference light source and the calibration system using the same can be obtained at low cost.

10 Claims, 8 Drawing Sheets

CALIBRATION REFERENCE LIGHT SOURCE AND CALIBRATION SYSTEM USING THE SAME

This application is based on Japanese Patent Application No. 2007-218791 filed on Aug. 24, 2007, the contents of which are hereby incorporated by reference.

BACKGROUND OF THE INVENTION

1. Field of the Invention

The present invention relates to a calibration reference light source and a calibration system using the same, which enable a user side to recalibrate wavelengths and sensitivities of a spectrophotometer and a spectral illuminometer.

2. Description of the Background Art

Figure 8:
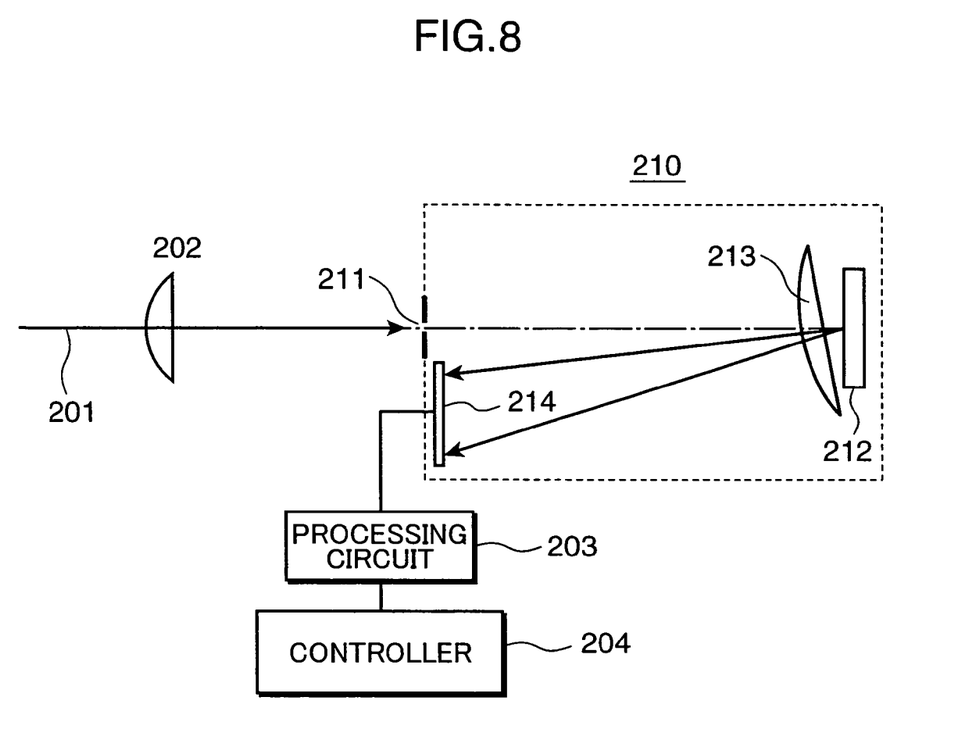
FIG. 8 is a block diagram showing a construction example of the spectrophotometer.

The spectrophotometer and spectral illuminometer are widely used to measure and evaluate radiances and colors of various light sources and display devices and normally have a construction as shown in FIG. 8. In this spectrophotometer, a light 201 to be measured is gathered by an objective optical system 202 to be incident on an incident slit 211 of a polychrometer 210. The beam incident on the slit forms a wavelength dispersed image of the incident slit 211 on a sensor array 214 via a diffraction grating 212 and an imaging optical system 213. Pixel intensity distributions En (n is a pixel number of 1, 2, . . . ) of the sensor array 214 according to the spectral intensity of the incident light are sent to a controller 204 via a processing circuit 203 to be converted into spectral radiances $L(\lambda)$.

Calibrations of such a spectrophotometer includes a wavelength calibration and a sensitivity calibration. The wavelength calibration is performed by saving a correspondence table (n-$\lambda$n correspondence table) of the pixel number n of the respective pixels of the sensor array 214 and a centroid wavelength $\lambda$n. The pixel intensity distributions En in an actual light to be measured are converted into spectral intensity distributions $E(\lambda)$ based on the above n-$\lambda$n correspondence table. Further, the sensitivity calibration is performed by saving a ratio of a spectral radiance reference value $L0(\lambda)$ to the spectral intensity distribution $E0(\lambda)$ in the case where a reference light source including a known black body radiation source that is obtained a spectral radiance reference value $L0(\lambda)$ such as an A-light source (2856 K) is measured, as a correction coefficient $C0(\lambda)$. In other words, $$C0(\lambda)=L0(\lambda)/E0(\lambda) \quad (1).$$

At the time of a light measurement by the thus calibrated spectrophotometer, the spectral intensity distributions $E(\lambda)$ obtained from the pixel intensity distributions En in accordance with the above n-$\lambda$n correspondence table are converted into spectral radiances $L(\lambda)$ as below using the above calibration coefficient $C0(\lambda)$.

$$L(\lambda)=C0(\lambda) \cdot E(\lambda) \quad (2)$$

Even if being calibrated as above at the time of manufacturing, the spectrophotometer cannot avoid a sensitivity change due to a wavelength change caused by a change in the optical arrangement of the built-in polychrometer 210 and characteristic changes of optical elements and circuit elements such as the objective optical system 202 and the diffraction grating 212. Thus, recalibration (correction) needs to be performed at a sufficient frequency in order to maintain accuracy over a long term. However, a radiation exitance $M(\lambda, T)$ of the A-light source, which has been conventionally used in the sensitivity calibration of the spectrophotometer, is given by Planck's law of radiation using C1, C2 as constants:

$$M(\lambda, T)=C1 \cdot \lambda^{-5} \cdot \exp[1-C2/(\lambda \cdot T)] \quad (3)$$

and relatively and absolutely largely depends on color temperature T.

Accordingly, it is necessary to control or monitor the color temperature to use this A-light source as a calibration reference. In order to maintain a radiation intensity of ±1% of the A-light source having a color temperature of 2856 K at 400 nm, the color temperature needs to be controlled with an accuracy of ±2 K. Thus, sufficient attentions need to be paid to the driving of the A-light source such as stabilization of a power supply voltage. On the other hand, at least two monitoring sensors having different spectral sensitivities are necessary for the monitoring of the color temperature. Filters, which are normally unavoidably temperature-dependent, are provided in these sensors, and wavelength errors of the filters need to be 0.5 nm or shorter. Further, attentions need to be paid to changes of the A-light source and the filters with time (e.g. wear damage of a filament in the A-light source).

Due to this difficulty to handle, the sensitivity recalibration (sensitivity correction) of the spectrophotometer is frequently performed by returning the spectrophotometer to a factory or service deposits of a manufacturer. Thus, it takes cost and time to return and recalibrate and it is difficult to recalibrate at a frequency necessary to maintain the accuracy. Accordingly, the present inventors previously proposed a calibration reference light source constructed by a plurality of single-wavelength light sources with stable wavelengths and semiconductor monitoring sensors with stable characteristics in Japanese Unexamined Patent Publication No. 2006-177785 (D1). Thus, this calibration reference light source using no A-light source is easy to handle and calibration at the user side is possible.

The wavelength stability of the single-wavelength light sources is essential even in the above prior art, relatively high-cost wavelength stabilized lasers such as gas lasers and temperature-controlled semiconductor lasers need to be used as the single-wavelength light sources. Further, lasers have a limit in usable wavelengths, single-wavelength reference lights of only about three wavelengths (408 nm, 532 nm and 635 nm) can be obtained within a visible range (380 to 780 nm) which is a general measurement wavelength range of spectrophotometers. The accuracy of correction coefficients at all the measurement wavelengths estimated based on data on the correction coefficients at these few wavelengths by interpolation or the like is low.

SUMMARY OF THE INVENTION

In view of the above situation, an object of the present invention is to provide a low-cost calibration reference light source and a calibration system using the same, which enable a user side to perform sensitivity corrections of spectrophotometers and spectral illuminometers with high accuracy and reliability.

In a calibration reference light source and a sensitivity calibration system using the same according to the present invention, a plurality of single-wavelength light sources for emitting reference lights having mutually different single-wavelengths are used instead of a black body radiation source for radiating a white light, and not only the intensities of the single-wavelength reference lights, but also the wavelengths thereof are measured to obtain sensitivity correction coefficients of intensity-to-radiance conversion data. Thus, obtained reference radiances are highly reliable and sensitivity correction of spectrophotometers and spectral illuminometers can be performed with high accuracy and reliability at a user side, whereby the calibration reference light source and the calibration system using the same can be obtained at low cost.

These and other objects, features, aspects and advantages of the present invention will become more apparent upon a reading of the following detailed description with reference to accompanying drawings.

BEST MODES FOR EMBODYING THE INVENTION

Hereinafter, one embodiment of the present invention is described with reference to the accompanying drawings. It should be noted that constructions identified by the same reference numerals in the respective drawings are the same constructions and are not repeatedly described.

First Embodiment

Figure 1:
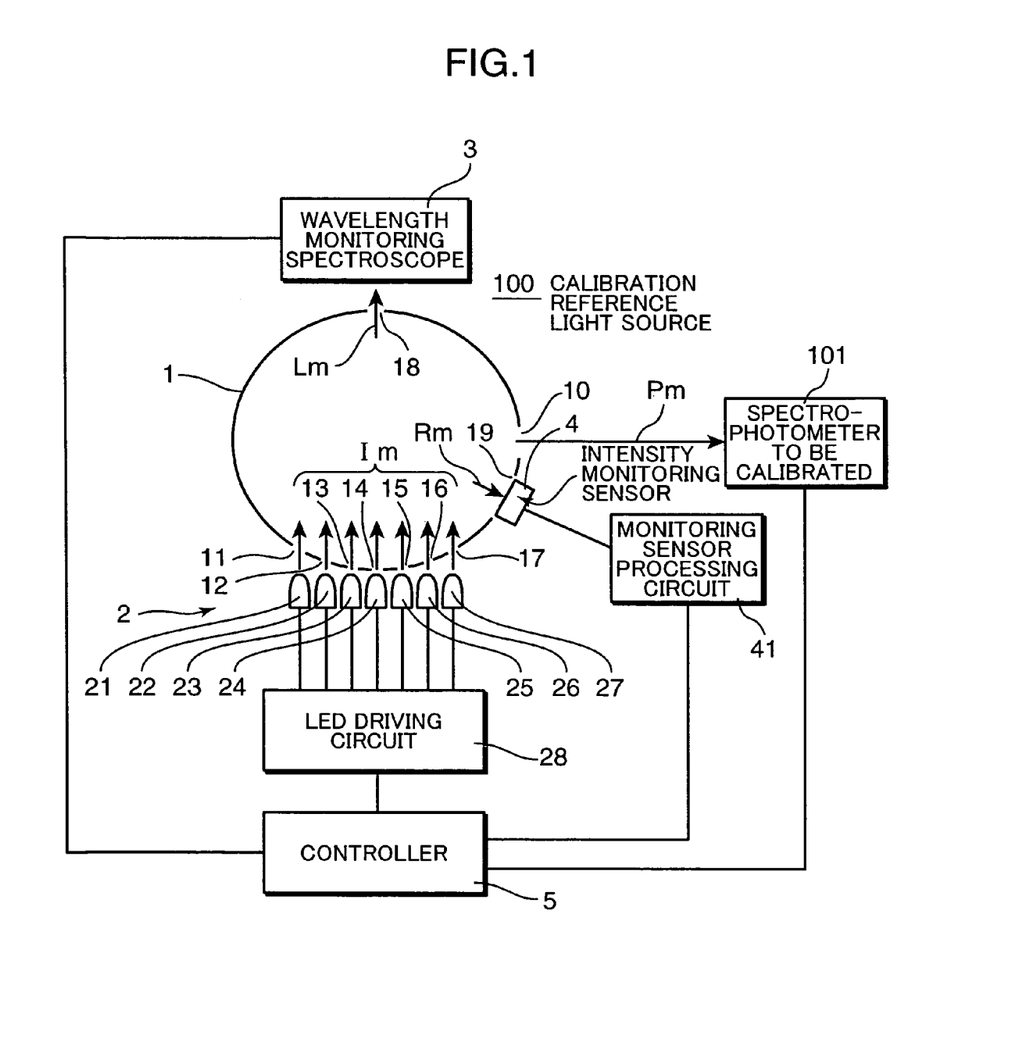
FIG. 1 is a block diagram showing constructions of a calibration reference light source for a spectrophotometer and a calibration system using the same according to one embodiment.

FIG. 1 is a block diagram showing constructions of a calibration reference light source 100 for a spectrophotometer and a calibration system using the same according to one embodiment. In FIG. 1, the calibration reference light source 100 of this embodiment includes, as main constitute elements, an integrating sphere 1 having an inner wall with a high reflectance and a high diffusivity, a light source unit 2 including light emitting diodes (LEDs) 21 to 27 (hereinafter, LEDm (m=1 to 7)) for emitting single-wavelength lights Im (m=1 to 7) having different wavelengths into the integrating sphere 1 through seven incident openings 11 to 17 formed in the integrating sphere 1, a wavelength monitoring spectroscope 3 to be attached to a wavelength monitoring opening 18 of the integrating sphere 1, an intensity monitoring sensor 4 to be attached to an intensity monitoring opening 19 of the integrating sphere 1 and a controller 5. A polychrometer similar to the polychrometer 210 used in the above spectrophotometer is used as the wavelength monitoring spectroscope 3.

Figure 2:
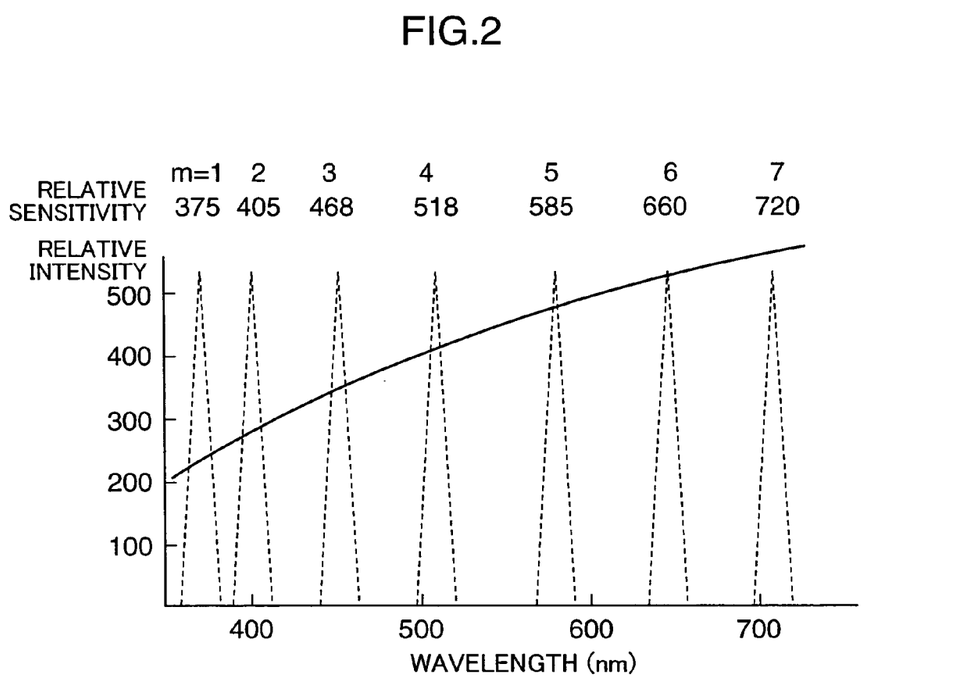
FIG. 2 is a graph showing relative spectral distributions of light emissions by LEDs as single-wavelength light sources and a spectral sensitivity of a silicon detector.

The LEDm have relative spectral distributions shown by broken line in FIG. 2 with wavelengths dispersed in a visible range (380 to 780 nm), e.g. 375, 405, 468, 518, 585, 660 and 720 nm as center (centroid) wavelengths. When the controller 5 successively turns these LEDm on by a specified drive current via an LED driving circuit 28 for driving the respective LEDm of the light source unit 2, single-wavelength lights Im emitted from the respective LEDm undergo multiple diffuse reflection in the integrating sphere 1 and are diffused and radiated from an emission opening 10 as single-wavelength reference lights Pm and spectral radiances $Ltm(\lambda)$ are measured by a spectrophotometer 101 to be calibrated. Simultaneously, parts Lm of the single-wavelength lights undergoing multiple diffuse reflection in the integrating sphere 1 are incident on the wavelength monitoring spectroscope 3 through the wavelength monitoring opening 18 of the integrating sphere 1, and a spectral distribution $Im(\lambda)$ is measured and fed to the controller 5. The controller 5 calculates a centroid wavelength of the spectral distribution $Im(\lambda)$ and sets it as a reference wavelength $\lambda m$. Similarly, the parts Rm of the single-wavelength lights are incident on the intensity monitoring sensor 4 through the intensity monitoring opening 19 of the integrating sphere 1 and a reference intensity $Irm(\lambda)$ is measured and fed to the controller 5 via a monitoring sensor processing circuit 41.

Here, since the single-wavelength lights Im by the LEDm are single-wavelength lights having known wavelengths, they can have the sensitivities thereof found at these wavelengths and can be monitored regardless of spectral sensitivities as long as being stable. Thus, in this embodiment, a highly stable bare silicon photodiode including no variation factor such as a filter is used as the intensity monitoring sensor 4 for the following reason. In a conventional calibration reference light source using a black body radiation source, monitoring accuracy is directly related to calibration accuracy in the case of monitoring the stability of the spectral radiance to serve as a reference value as described above and the spectral radiance, but the influence of the relative spectral distributions (profile) can be basically ignored as in D1 in the calibration reference light source 100 of this embodiment for giving radiance standards at the reference wavelengths $\lambda m$ according to the respective single-wavelength lights Im.

Specifically, as shown in FIG. 2, the spectral distributions of the respective LEDm have half bandwidths of 10 to 20 nm and cannot be, strictly speaking, said to be single-wavelength lights, but are substantially symmetrical with respect to the centroids. On the other hand, as shown by solid line in FIG. 2, the influence of the half bandwidths can be ignored if the spectral sensitivity of the silicon photodiode is moderate and can be locally linearly approximated. LEDs with wide half bandwidths may be used in combination with band pass filters having center wavelengths correspond to emission wavelengths in order to obtain necessary half bandwidths.

Upon the calibration, the controller 5 calculates intensity-to-radiance conversion coefficients $K(\lambda m)$ at the reference wavelengths $\lambda m$ based on intensity-to-radiance conversion data given beforehand and stored as described later for converting a measured reference intensity into a reference radiance. In this embodiment, as described later, the controller 5 calculates the intensity-to-radiance conversion coefficients $K(\lambda m)$ at the reference wavelengths $\lambda m$ as follows since the intensity-to-radiance conversion coefficients $K(\lambda 0 m)$ at the reference wavelengths $\lambda 0 m$ and rates of change $dK(\lambda m)/d\lambda m$ at the time of calibrating the reference light source.

$$K(\lambda m) = K(\lambda 0 m) + (\lambda m - \lambda 0 m) \cdot dK(\lambda m)/d\lambda m \quad (4)$$

Further, the reference intensities Irm of the above intensity monitoring are converted into the reference radiances Lrm using the calculated intensity-to-radiance conversion coefficients $K(\lambda m)$.

$$Lrm = K(\lambda m) \cdot Irm \quad (5)$$

In this way, the emission opening 10 functions as a radiance reference plane for emitting the single-wavelength reference lights Pm of the reference radiances Lrm at the reference wavelengths λm.

On the other hand, the spectrophotometer 101 to be calibrated is calibrated with respect to the wavelengths and the sensitivities at the respective wavelengths at the time of manufacturing as described above. The spectrophotometer 101 to be calibrated is arranged at a position where the single-wavelength reference lights Pm from the emission opening 10 can be measured and is connected to the controller 5 as shown in FIG. 1 in order to correct errors (wavelength errors and sensitivity errors) of the spectrophotometer 101 occurring due to changes with time, particularly sensitivity errors, using the calibration reference light source 100 and the calibration system using the same according to this embodiment. Thus, the spectrophotometer 101 to be calibrated is controlled by the controller 5. Since the wavelength errors influence the sensitivity errors, the wavelength errors are corrected as follows prior to the correction of the sensitivity errors.

Specifically, the wavelength errors are corrected by correcting the above pixel-centroid wavelength (n-λn) correspondence table. The controller 5 successively turns the respective LEDm on and causes the spectrophotometer 101 to be calibrated to measure the spectral radiances Ltm(λ) of the single-wavelength reference lights Pm. The controller 5 calculates the centroid wavelengths λtm of the obtained spectral radiances Ltm(λ) and calculates differences (wavelength differences) dλm from the reference wavelengths λm obtained by the wavelength monitoring spectroscope 3 as described below:

$$d\lambda m = \lambda tm - \lambda m \quad (6).$$

Further, the controller 5 interpolates the wavelength errors dλm at the reference wavelengths λm to calculate wavelength errors dλn at the centroid wavelengths λn of the respective pixels, thereby calculating corrected centroid wavelengths λ'n.

$$\lambda'n = \lambda n - d\lambda n \quad (7)$$

By storing the n-λ'n correspondence table corrected in this way in the spectrophotometer 101 to be calibrated, the wavelength errors are corrected.

Next, the sensitivity errors are corrected by calculating a sensitivity correction coefficient C(λ) for each wavelength λ and storing it in the spectrophotometer 101 to be calibrated. The controller 5 calculates the intensity-to-radiance conversion coefficients K(λm) at the reference wavelengths λm by the above Equation (4), converts the reference intensities Irm of the single-wavelength reference lights Pm into the reference radiances Lrm by the Equation (5), and calculates radiance integrated values Stm of the spectral radiances Ltm(λ) measured by the spectrophotometer 101 to be calibrated as described below.

$$Stm = \int Ltm(\lambda)d\lambda \quad (8)$$

Subsequently, the controller 5 calculates the sensitivity correction coefficients C(λm) at the reference wavelengths λm based on ratios of the reference radiances Lrm and the radiance integrated values Stm.

$$C(\lambda m) = Lrm/Stm \quad (9)$$

The sensitivity errors can be corrected by interpolating these sensitivity correction coefficients C(λm) to calculate the sensitivity correction coefficients C(λ) at all the measurement wavelengths and storing them.

Figure 3:
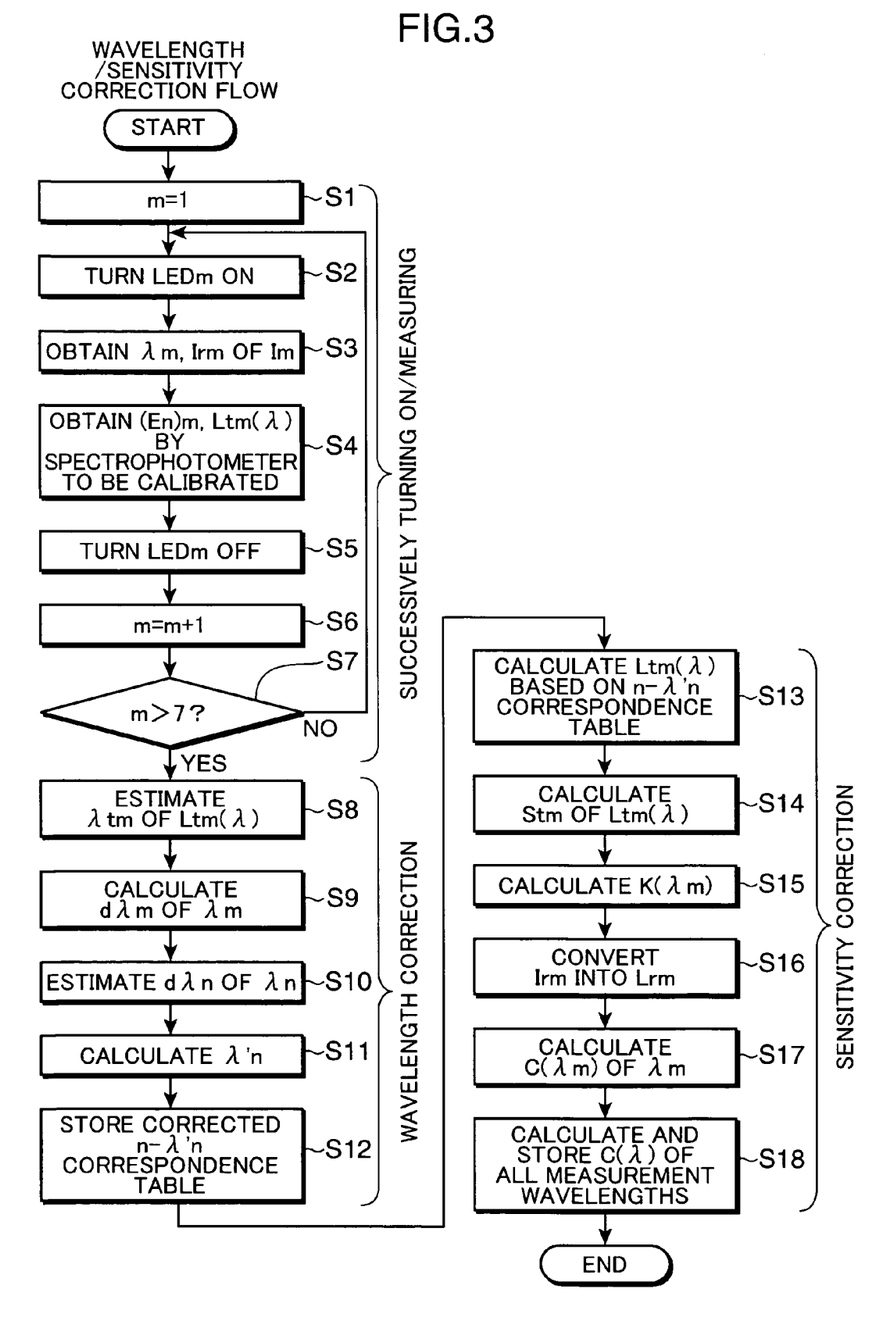
FIG. 3 is a flow chart showing a method for correcting a wavelength error and a sensitivity error of the spectrophotometer to be calibrated.

FIG. 3 is a flow chart showing the above method for correcting the wavelength errors and the sensitivity errors. First of all, in Steps S1 to S7, the seven LEDm are successively turned on (Step S2), the reference wavelengths λm are obtained from the wavelength monitoring spectroscope 3 and the reference intensities Irm are obtained from the intensity monitoring sensor 4 in response to the emitted lights Im (Step S3), and the LEDm are turned off (Step S5) after pixel intensity distribution measurement values (En)m and spectral radiance measurement values Ltm(λ) are obtained from the spectrophotometer 101 to be calibrated (Step S4). These steps are repeated.

Subsequently, in Steps S8 to S12, the wavelength errors are corrected. In Step S8, the centroid wavelengths λtm of the spectral radiances Ltm(λ) are calculated for the respective single-wavelength reference lights Pm. In Step S9, the differences (wavelength differences) dλm from the reference wavelengths λm are calculated by the above Equation (6). The wavelength errors dλn at the centroid wavelengths λn of the pixels are calculated by interpolation in Step S10, the corrected centroid wavelengths λ'n are calculated by the Equation (7) in Step S11, and an n-λ'n correspondence table 2corrected by the corrected centroid wavelengths λ'n is stored in Step S12.

The sensitivity errors are corrected in Steps S13 to S18. In Step S13, the pixel intensity distributions (En)m are reconverted into the spectral radiances Ltm(λ) in accordance with the above n-λ'n correspondence table. The radiance integrated values Stm of the spectral radiances Ltm(λ) are calculated by the above Equation (8) in Step S14, the conversion coefficients K(λm) at the reference wavelengths λm are calculated by the above Equation (4) in Step S15, and the reference intensities Irm are converted into the reference radiances Lrm by the above Equation (5) in Step S16. The sensitivity correction coefficients C(λm) at the reference wavelengths λm are calculated by the above Equation (9) in Step S17, and the sensitivity correction coefficients C(λ) at all the measurement wavelengths are calculated through interpolation and stored in Step S18.

In the above description, the reference wavelengths λm having different values are given from the wavelength monitoring spectroscope 3 and the reference intensities Irm having different values are given from the intensity monitoring sensor 4 every time the respective single-wavelength reference lights Pm are emitted. Reference radiance reference values Lr0(λ) at the reference wavelengths λ may be determined beforehand and the drive current for the LEDm may be controlled such that the reference radiances Lrm at the reference wavelengths λm coincide with the specified reference radiance reference values Lr0(λm) upon the emission of the single-wavelength reference lights Pm. In this case, only the reference wavelength λm is given when each single-wavelength reference light Pm is emitted, and the specified reference radiance reference value Lr0(λm) is used as the reference radiance Lrm.

At the time of an actual light measurement by the spectrophotometer 101 recalibrated as described above, the obtained pixel intensity distributions En are converted into the spectral radiances L(λ) using the stored n-λ'n correspondence table and outputted after being likewise corrected into L'(λ) as below using the stored sensitivity correction coefficients C(λ).

$$L'(\lambda) = C(\lambda) \cdot L(\lambda) \quad (10)$$

Figure 4:
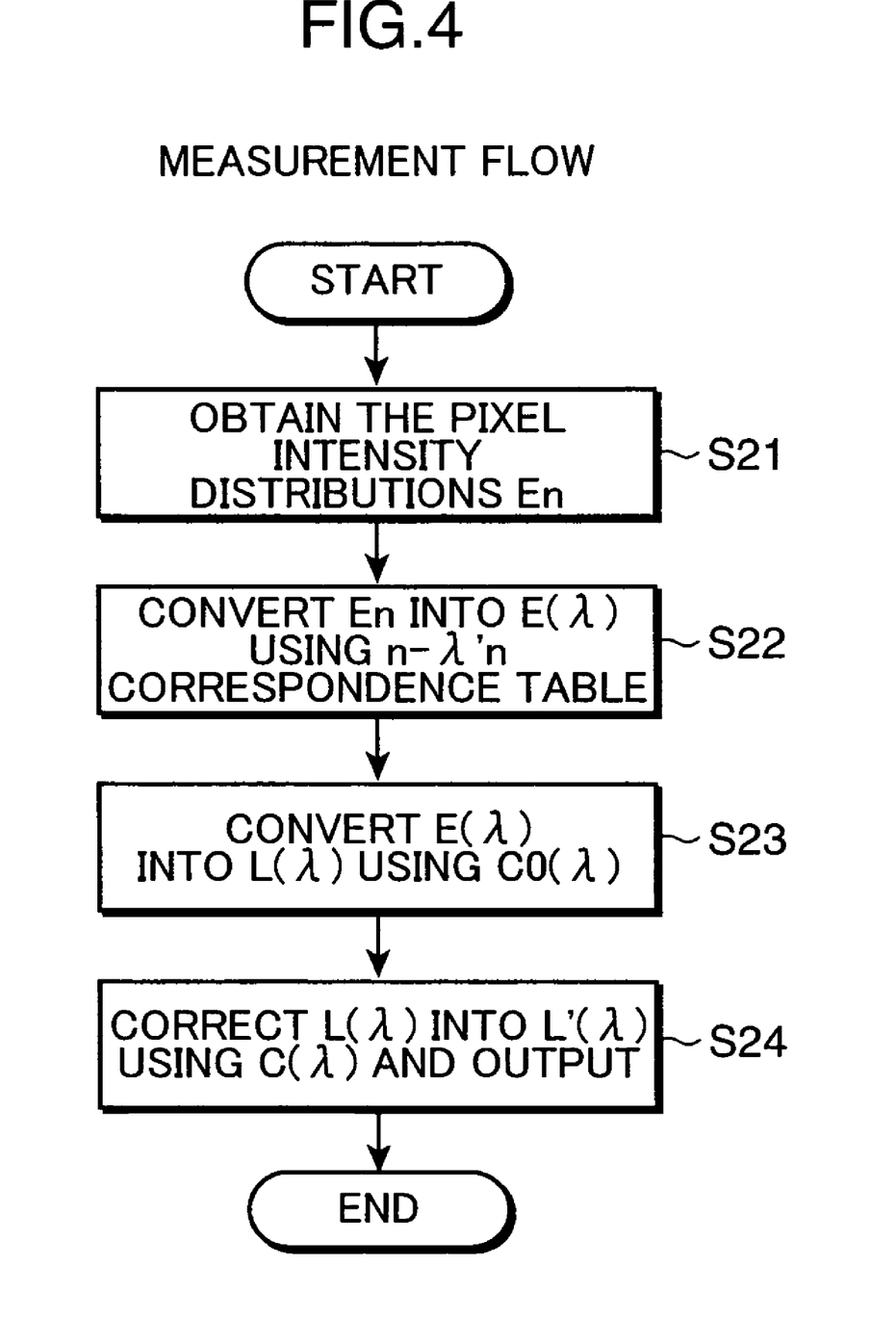
FIG. 4 is a flow chart showing the operation of the spectrophotometer at the time of a measurement.

FIG. 4 is a flow chart showing the operation at the time of this measurement. In Step S21, the pixel intensity distributions En are obtained by measuring the lights. In Step S22, the pixel intensity distributions En are converted into the spectral intensity distributions E(λ) by the stored n-λ'n correspondence table. In Step S23, the spectral intensity distributions E(λ) are converted into the spectral radiances L(λ) by the Equation (2) using the stored correction coefficients C0(λ). In Step S24, the spectral radiances L(λ) are corrected into L'(λ) by the Equation (17) using the stored correction coefficients C(λ) and are outputted.

On the other hand, the wavelength monitoring spectroscope 3 needs to be calibrated to calibrate the calibration reference light source 100 itself. To this end, instead of the spectrophotometer 101 to be calibrated, a Hg lamp or the like may be arranged at the emission opening 10 and the calibration can be performed by the technique proposed by the present inventor in Japanese Unexamined Patent Publication No. 2007-10364 using an (emission line) spectral light incident from there. A wavelength change at a user side after the calibration is corrected by a technique disclosed in Japanese Unexamined Patent Publication No. 2005-69784 using a single-wavelength light having a wavelength of 375 nm and emitted from a LED 1. In this correction method, corrections are made by a uniform correction amount at all the measurement wavelengths, but it is sufficient to maintain accuracy between wavelength recalibrations performed, for example, once a year.

Figure 5:
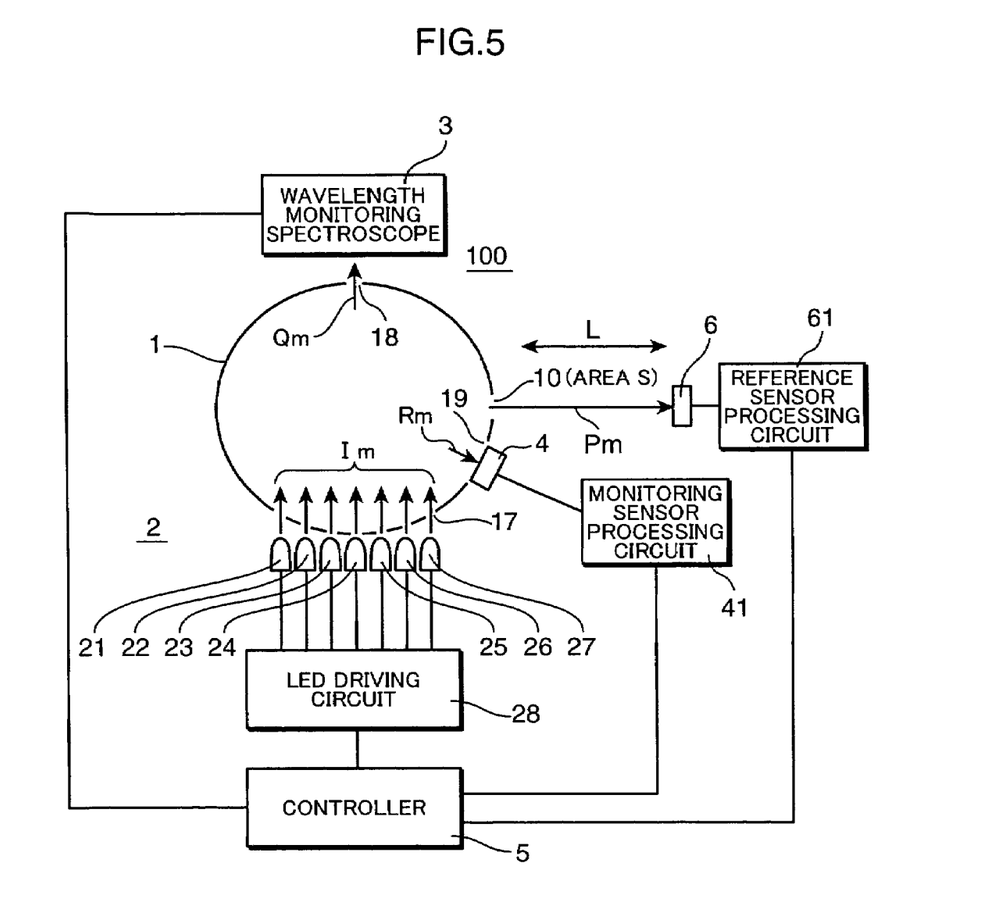
FIG. 5 is a block diagram showing a calibration method for the calibration reference light source.

After the calibration of the wavelength monitoring spectroscope 3, radiance calibration is performed in the intensity monitoring sensor 4 and the monitoring sensor processing circuit 41 to obtain the above intensity-to-radiance conversion data, which are then stored. Here, the intensity-to-radiance conversion coefficients K(λ0 m) at the reference wavelengths λ0 m and their rates of change dK(λm)/dλm are obtained. To this end, the single-wavelength reference lights P0 m at the reference wavelengths λ0 m successively emitted through the emission opening 10 (radiance reference plane) by the LEDm are received by a reference silicon detector 6 arranged at a specified distance L(m) and having a known spectral sensitivity D(λ) (photocurrent (A/W) in response to a single-wavelength incident light having a unit energy). The detection result is inputted to the controller 5 via a reference sensor processing circuit 61.

Here, if $S(m^2)$ denotes the area of the above radiance reference plane, the photocurrent Q0 m(A) of the reference silicon detector 6 is converted into a radiance L0 m($W/m^2$) of the radiance reference plane as follows. The spectral sensitivity D(λ) of the reference silicon detector 6 can be valued at standard maintenance facilities in the respective countries.

$$L0m = [Q0m \cdot L^2]/[D(\lambda 0m) \cdot S] \quad (11)$$

In the case where the simultaneously measured reference intensities are set to Ir0 m and the reference wavelengths are set to λ0 m, the intensity-to-radiance conversion coefficients K(λ0 m) at the wavelengths λ0 m are given as follows.

$$K(\lambda 0m) = L0m/Ir0m \quad (12)$$

Figure 6:
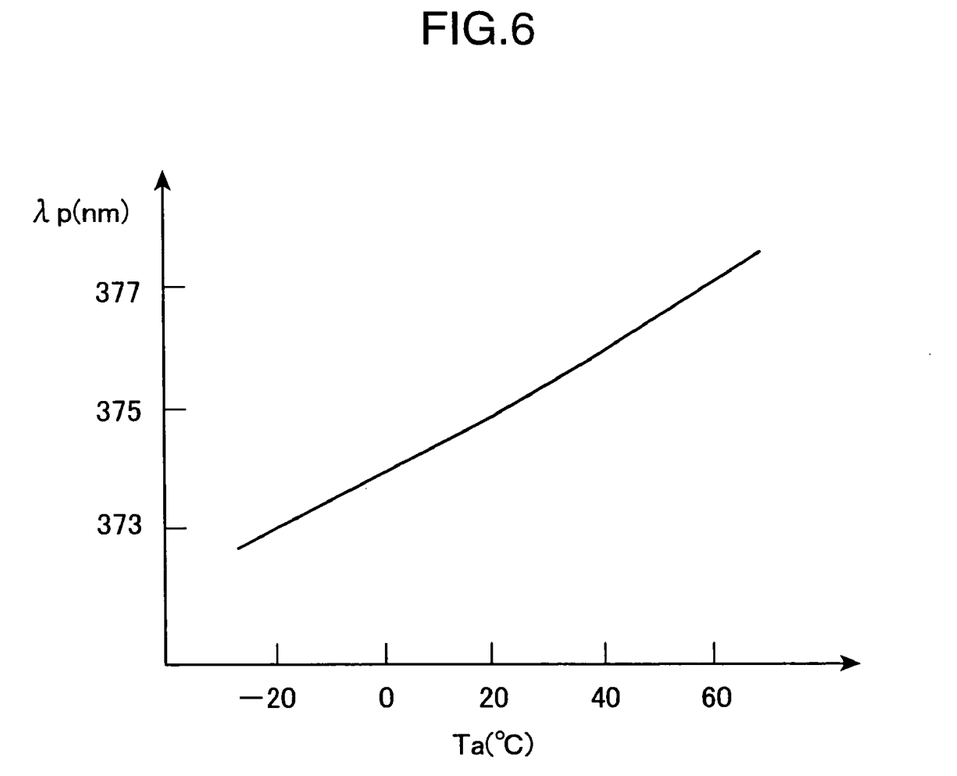
FIG. 6 is a graph showing the temperature dependency of the LED.

Since the emission wavelengths of the LEDm are not stable, the rates of change dK(λm)/dλm of the conversion coefficients K(λm) in relation to the change of the wavelength λm are calculated and stored together with K(λ0 m). In order to calculate these rates of change dk(λm)/dλm, the emission wavelengths of the LEDm need to be changed. However, since the emission wavelength of the LED depends on an operating temperature as shown in FIG. 6, the emission wavelengths can be changed by turning the respective LEDm on while changing the operating temperature. The operating temperatures of the LEDm can be changed, for example, by a method for changing the drive current, a method using light emission immediately after the application and after a specified time, i.e. before and after a temperature increase caused by the driving even if the drive current is constant. Here, the latter method is used since being easily implementable.

In the above radiance calibration, the spectral sensitivity D(λ) of the reference silicon detector 6, the reference wavelengths λ0 m of the single-wavelength reference light P0m, the area S of the radiance reference plane and accuracy in the distance L from the radiance reference plane to the reference silicon detector 6 influence calibration accuracy. Here, the area S and the distance L can be obtained with high accuracy and, hence, calibration accuracy substantially depends on the spectral sensitivity D(λ) of the reference silicon detector 6 and the wavelength accuracy of the wavelength measuring unit 3. However, the spectral sensitivity of the reference silicon detector 6 having a simple construction as described above is highly stable with temperature and time, the wavelength accuracy of the wavelength monitoring spectroscope 3 can be precisely calibrated by an emission line light source such as a Hg lamp and wavelength changes after the calibration can also be corrected. Therefore, the above radiance calibration method has substantially high accuracy and reliability.

Figure 7:
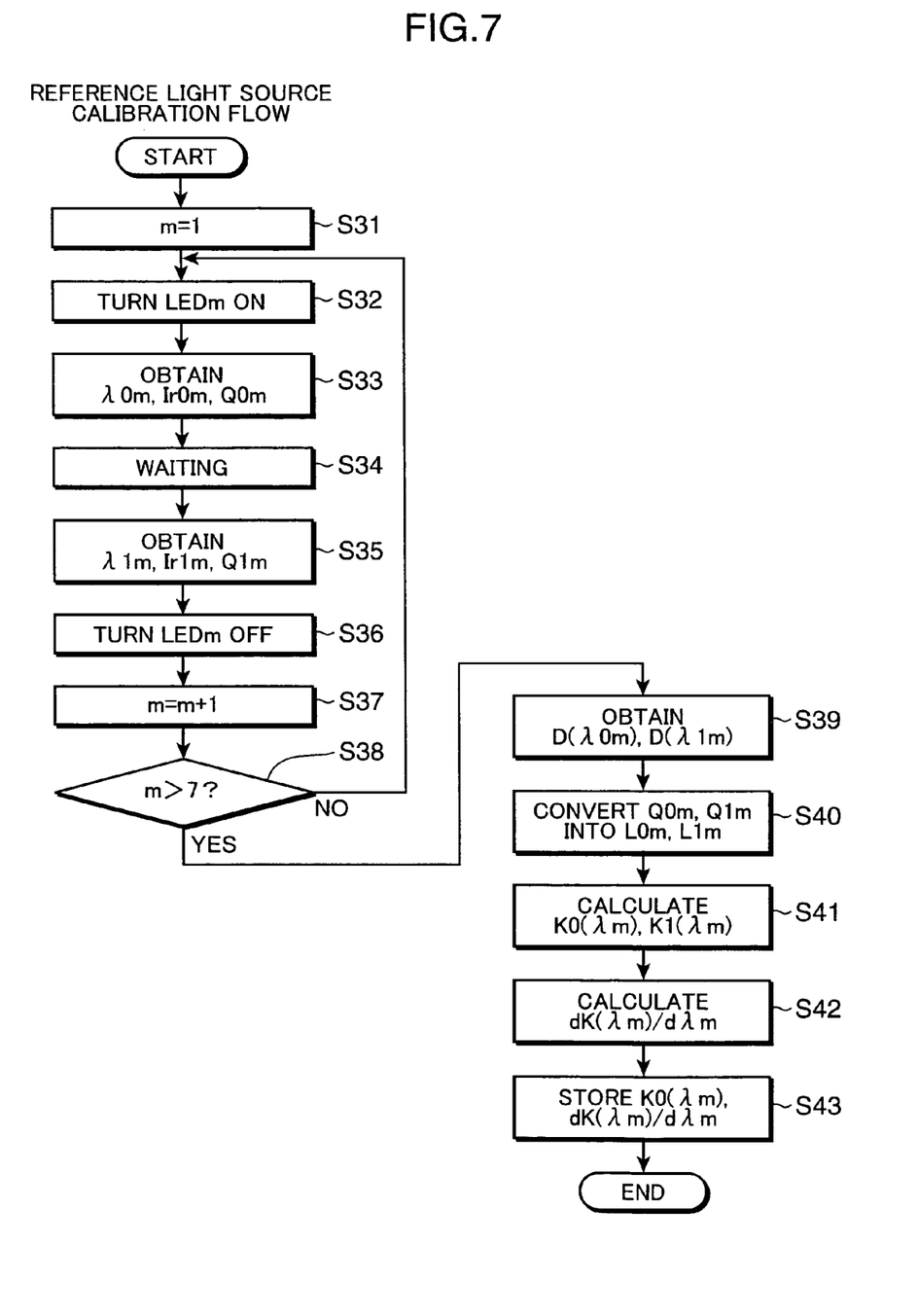
FIG. 7 is a flow chart showing the calibration operation of the calibration reference light source.

FIG. 7 is a flow chart showing a calibration process of the calibration reference light source 100 as described above. In Steps S31 to S38, the LEDm are successively turned on to calculate the intensity-to-radiance conversion coefficients K(λ0 m), and the rates of change dk(λm)/dλm are calculated from the wavelength changes dλm and conversion coefficient changes dK(λm) before and after the temperature increase. More specifically, the LEDm are turned on (Step S32), the reference wavelengths λ0 m, reference intensities Ir0 m, and the photocurrent Q0 m of the reference silicon detector 6 of the emitted lights Im immediately after the LEDm are turned on are obtained (Step S33). After the lapse of a specified time with the LEDm kept on (Step S34), the reference wavelengths λ1 m, the reference intensities Ir1 m and the photocurrent Q1 m of the reference silicon detector 6 are obtained (Step S35) and, then, the LEDm are turned off (Step S36). This process is repeatedly performed.

Subsequently, in Step S39, the reference wavelengths λ0 m of the respective single-wavelength reference lights Pm, the sensitivities D(λ0 m), D(λ1 m) at λ1 m are respectively obtained from the given spectral sensitivity D(λ) of the reference silicon detector 6. In Step S40, the photocurrents Q0 m, Q1 m are converted into the radiances L0 m, L1 m of the radiance reference plane by the above Equation (11). In Step S41, the intensity-to-radiance conversion coefficients K(λ0 m), K(λ1 m) are calculated by the above Equation (12). The rates of change dK(λm)/dλn are calculated by the following Equation in Step S42, and the intensity-to-radiance conversion coefficients K(λ0 m) and the rates of change dK(λm)/dλm are stored in Step S43.

$$dK(\lambda m)/d\lambda m = [K(\lambda 0m) - K(\lambda 1m)]/[\lambda 0m - \lambda 1m] \quad (13)$$

Although the calibration reference light source 100 is used to correct the errors with time (wavelength errors and sensitivity errors) of the spectrophotometer 101 initially calibrated at the time of manufacturing in this embodiment, the same method can be used for the initial calibration at the time of manufacturing, whereby traceability of the initial calibration and the calibrations with time can be unified. In this case, the spectrophotometer 101 to be calibrated first has the spectral sensitivity preliminarily calibrated by a white reference light by a black body radiation source such as an A-light source given with a spectral radiance reference value and is then finally calibrated by wavelength and sensitivity corrections using the above single-wavelength reference lights. The calibration accuracy finally depends on the wavelength and sensitivity correction accuracies and, eventually, depends on the wavelength accuracy of the wavelength monitoring spectroscope 3 of the calibration reference light source 100 and the spectral sensitivity of the intensity monitoring sensor 4 of the calibration reference light source 100 as references. The wavelength monitoring spectroscope 3 and the intensity monitoring sensor 4 are both more stable than the black body radiation source and the accuracies thereof are easy to maintain. Further, since corrections are made using the single-wavelength reference lights, no high accuracy is required for the spectral radiance reference value of the white reference light used for the preliminary calibration.

As described above, this embodiment is similar to the above D1 in that the intensities at the respective reference wavelengths dispersed in the measurement wavelength range are measured by the intensity monitoring sensor 4 using the single-wavelength radiation from the radiance reference plane of the light source unit 2 including a plurality of single-wavelength light sources as a radiance reference instead of the black body radiation source, and the influence of the relative spectral intensities can be ignored in the single-wavelength reference lights. Thus, a bare silicon photodiode having a highly stable spectral sensitivity to temperature and time and the like can be used as the intensity monitoring sensor 4. Therefore, this embodiment has the same feature as D1 that the obtained reference radiances are highly reliable. In this way, the sensitivity corrections for spectrophotometers and spectral illuminometers can be performed with high accuracy and reliability at the user side.

In addition, the LEDs 21 to 27 that are inexpensive, have many wavelengths and can locate the reference wavelengths in the measurement wavelength range at a density necessary to ensure the accuracy of the correction coefficients by interpolation can be used as the single-wavelength light sources instead of the wavelength stabilized lasers that are expensive and have fewer wavelengths as in D1, whereby the calibration (correction) accuracy in the entire measurement wavelength range can be increased. Further, since the intensity monitoring sensor 4 monitors only the intensities of the single-wavelength reference lights and the wavelength monitoring spectroscope 3 monitors only the wavelengths of the single-wavelength reference lights, stability is substantially high and accuracy can be easily maintained.

Specifically, the calibration reference light source 100, in which the calibration reference is changed from the light sources to the wavelength monitoring spectroscope 3 and the intensity monitoring sensor 4, has high stability with temperature and time and enables the user side to perform the recalibration (correction) of the wavelengths and sensitivities with high accuracy and reliability. Thus, the user can save cost and time for the recalibration at the manufacturer and can constantly use the spectrophotometer with high accuracy by recalibrating (correcting) the spectrophotometer 101 at a sufficient frequency.

Since the radiance reference plane is the emission opening 10 of the integrating sphere 1 including the wavelength monitoring spectroscope 3 and the intensity monitoring sensor 4, on which opening the beams from the LEDs 21 to 27 as the plurality of single-wavelength light sources are incident, the radiance reference plane can be used as a diffusing radiance plane. Thus, the radiance of the radiance reference plane can be stably monitored by measuring parts of the lights having undergone multiple diffuse reflection in the integrating sphere 1 by the intensity monitoring sensor 4.

Technologies of various modes are disclosed in this specification as described above. Main ones of these are summarized as follows.

A calibration reference light source according to one mode is the one used for calibrating wavelengths and sensitivities of spectroradiometer and comprising a plurality of monochromatic light sources for emitting reference lights having mutually different single-wavelengths; a reference light emitter for emitting the single-wavelength reference lights; a wavelength measuring unit for measuring the wavelengths of the single-wavelength reference lights as reference wavelengths; an intensity measuring unit for measuring the intensities of the single-wavelength reference lights as reference intensities; and a controller for successively turning the plurality of monochromatic light sources on for the radiation of the single-wavelength reference lights, controlling the measurement of the wavelengths of the single-wavelength reference lights by the wavelength measuring unit, and controlling the measurement of the intensities of the single-wavelength reference lights by the intensity measuring unit.

Preferably, in the above calibration reference light source, the controller calculates the reference radiances of the reference light emitter based on the reference wavelengths and reference intensities of the single-wavelength reference lights.

A calibration reference light source according to one mode is the one used for calibrating wavelengths and sensitivities of spectrophotometers and spectral illuminometers and comprising a plurality of single-wavelength light sources for emitting reference lights having mutually different single-wavelengths; a reference plane member having a radiance reference plane for radiating the single-wavelength reference lights; a wavelength measuring unit for measuring the wavelengths of the single-wavelength reference lights as reference wavelengths; an intensity measuring unit for measuring the intensities of the single-wavelength reference lights as reference intensities; and a controller for successively turning the plurality of single-wavelength light sources on for the radiation of the single-wavelength reference lights and calculating the reference radiances of the radiance reference plane from the reference wavelengths and reference intensities of the single-wavelength reference lights measured by the wavelength measuring unit and the intensity measuring unit.

A sensitivity calibration system according to another mode is the one for a spectrophotometer comprises the above calibration reference light source and a spectrophotometer to be calibrated, wherein a spectral sensitivity change of the spectrophotometer to be calibrated is corrected based on differences between radiance measurement values calculated for the respective plurality of single-wavelength reference lights by the spectrophotometer to be calibrated and reference radiances at reference wavelengths of the single-wavelength reference lights.

The above constructions is similar to the above D1 in that intensities at the respective reference wavelengths dispersed in the measurement wavelength range are measured by the intensity measuring unit using the single-wavelength radiation from the radiance reference plane with a plurality of single-wavelength light sources as light sources as a radiance reference instead of using a black body radiation source for radiating a white light, but differs from the above D1 in that the wavelengths are measured by the wavelength measuring unit (spectroscope), the controller converts the measured reference intensities into the reference radiances based on these measurement results using intensity-to-radiance conversion data given beforehand, calculates sensitivity correction coefficients at the respective reference wavelengths and further calculates sensitivity correction coefficients at all the measurement wavelengths by mathematical interpolation.

Accordingly, the influence of relative spectral intensities can be ignored in the single-wavelength reference lights. Thus, there are the same features as in D1 that a bare silicon photodiode having a highly stable spectral sensitivity to temperature and time can be used as an intensity monitoring sensor and that the obtained reference radiances are highly reliable. In this way, the sensitivities of spectrophotometers and spectral illuminometers can be corrected with high accuracy and reliability at a user side.

In addition, light emitting diodes which have slightly larger half bandwidths, are inexpensive and have many wavelengths although being inferior in wavelength stability and can locate reference wavelengths in a measurement wavelength range at a density necessary to ensure the accuracy of correction coefficients by interpolation can be used as the single-wavelength light sources instead of semiconductor lasers which are expensive and have fewer wavelengths as in D1, wherefore calibration (correction) accuracy in the entire measurement wavelength range can be increased. Further, since the intensity measuring unit monitors only the intensities of the single-wavelength reference lights and the wavelength measuring unit monitors only the wavelengths of the single-wavelength reference lights, stability is substantially high and accuracy can be easily maintained.

Specifically, the calibration reference light source, in which the calibration reference is changed from the light sources to the wavelength measuring unit and the intensity measuring unit, has high stability with temperature and time and enables a user side to perform the recalibration (correction) of wavelengths and sensitivities with high accuracy and reliability. Thus, the user can save cost and time for the recalibration at the manufacturer and can constantly use the spectrophotometer with high accuracy by recalibrating (correcting) the spectrophotometer at a sufficient frequency.

Preferably, in the above calibration reference light source, the controller controls the monochromatic light sources such that the reference radiances of the respective single-wavelength reference lights calculated from the measured reference wavelengths and reference intensities of the single-wavelength reference lights coincide with specified reference radiance reference values at the reference wavelengths.

Further, preferably, in the above calibration reference light source, the intensity measuring unit includes a light detector having a sensitivity in a wavelength range of the single-wavelength reference lights by the plurality of single-wavelength light sources and has no optical element influential to the sensitivity of the light detector.

According to the above constructions, reference intensities can be obtained with high stability and reliability by using the light detector such as a silicon photodiode highly stable with temperature and time as the intensity measuring unit in a bare state free from a belonging optical element.

Preferably, in the above calibration reference light source, at least one of the monochromatic light sources is LED.

Preferably, in the above calibration reference light source, the reference light emitter includes an integrating sphere having incident apertures for allowing the single-wavelength light to enter, respectively, and an exit aperture for allowing the single-wavelength reference light to exit by iterative reflection of the incident monochromatic light. The wavelength measuring unit measures the wavelengths of the single-wavelength light iteratively reflected by the integrating sphere, and the intensity measuring unit measures the intensities of the single-wavelength light iteratively reflected by the integrating sphere.

Preferably, in the above calibration reference light source, the reference plane member is an integrating sphere on which beams are incident from the plurality of single-wavelength light sources and which includes the wavelength measuring unit and the intensity measuring unit and uses the emission opening as the radiance reference plane.

According to the above construction, the radiance reference plane can be used as a diffusing radiance plane, and the radiance of the radiance reference plane can be stably monitored by measuring parts of the lights having undergone multiple diffuse reflection in the integrating sphere by the intensity measuring unit.

Preferably, in the above calibration reference light source, a relationship between the reference intensities at the reference wavelengths and the reference radiances of the reference light emitter (the radiance reference plane) is given by conversion coefficients, which are ratios of the reference radiances of the reference light emitter by the single-wavelength reference lights having basic wavelengths near the reference wavelengths to the reference intensities of the single-wavelength reference lights, and rates of change of the conversion coefficients in relation to wavelength changes of the single-wavelength reference lights.

According to the above construction, intensity-to-radiance conversion coefficients $K(\lambda 0\,m)$ at the basic wavelengths $\lambda 0\,m$ near the reference wavelengths and their rates of changes $dK(\lambda m)/d\lambda m$ are used as the intensity-to-radiance conversion data.

Accordingly, the conversion coefficients $K(\lambda m)$ at the reference wavelengths $\lambda m$ of the single-wavelength reference lights can be calculated by correcting the conversion coefficients $K(\lambda 0\,m)$ at the basic wavelengths $\lambda 0\,m$ by differences between the reference wavelengths $\lambda m$ and the basic wavelengths $\lambda 0\,m$ and the rates of change $dK(\lambda m)/d\lambda m$.

Preferably, in the above calibration reference light source, monochromatic light sources are light emitting diodes and the rates of the change of the conversion coefficients are given based on the single-wavelength reference lights emitted from the light emitting diodes operating at a plurality of different temperatures.

According to the above construction, the rates of changes $dK(\lambda m)/d\lambda m$ can be easily calculated since being calculated by operating the light emitting diodes as the single-wavelength light sources at the plurality of different temperatures.

Preferably, in the above calibration reference light source, basic radiances of the reference light emitter (the radiance reference plane) are radiances obtained by converting output signals of a reference light detector having received the single-wavelength reference lights based on sensitivities at the reference wavelengths of the single-wavelength reference lights obtained from a known spectral sensitivity of the reference light detector, a distance of the reference light detector from the reference light emitter and an emitting area of the reference light emitter.

According to the above construction, the accuracies of the spectral sensitivity $D(\lambda)$ of the reference light detector, the reference wavelengths $\lambda 0\,m$ of the single-wavelength reference lights $P0\,m$, the area $S$ of the reference light emitter (the radiance reference plane) and the distance $L$ from the reference light emitter to the reference light detector influence calibration accuracy. However, since the area $S$ and the distance $L$ can be obtained with high accuracy, calibration accuracy substantially depends on the spectral sensitivity $D(\lambda)$ of the reference light detector and the wavelength accuracy of the wavelength measuring unit. The spectral sensitivity of the reference light detector having a simple construction is highly stable with temperature and time, and the wavelength accuracy of the wavelength measuring unit can be precisely calibrated by an emission line light source such as a Hg lamp and wavelength changes after the calibration can also be corrected. Therefore, the basic radiances L0 m obtained by this method substantially have high accuracy and reliability.

The present invention has been appropriately and sufficiently described above by way of embodiments with reference to the drawings, but it should be appreciated that a person skilled in the art can easily modify and/or improve the above embodiments. Accordingly, a modified embodiment or improved embodiment carried out by the person skilled in the art should be interpreted to be embraced by the scope as claimed unless departing from the scope as claimed.

What is claimed is:

1. A calibration reference light source used for calibrating wavelengths and sensitivities of spectroradiometer, comprising:
   a plurality of monochromatic light sources for emitting reference lights having mutually different single-wavelengths;
   a reference light emitter for emitting the single-wavelength reference lights;
   a wavelength measuring unit for measuring the wavelengths of the single-wavelength reference lights as reference wavelengths;
   an intensity measuring unit for measuring the intensities of the single-wavelength reference lights as reference intensities; and
   a controller for successively turning the plurality of monochromatic light sources on for the radiation of the single-wavelength reference lights, controlling the measurement of the wavelengths of the single-wavelength reference lights by the wavelength measuring unit, and controlling the measurement of the intensities of the single-wavelength reference lights by the intensity measuring unit.

2. A calibration reference light source according to claim 1, wherein the controller calculates the reference radiances of the reference light emitter based on the reference wavelengths and reference intensities of the single-wavelength reference lights.

3. A calibration reference light source according to claim 2, wherein the controller controls the monochromatic light sources such that the reference radiances of the reference light emitter by the respective single-wavelength reference lights calculated from the measured reference wavelengths and reference intensities of the single-wavelength reference lights coincide with specified reference radiance reference values at the reference wavelengths.

4. A calibration reference light source according to claim 1, wherein at least one of the monochromatic light sources is LED.

5. A calibration reference light source according to claim 1, wherein the intensity measuring unit includes a light detector having a sensitivity in a wavelength range of the single-wavelength reference lights by the plurality of monochromatic light sources and has no optical element influential to the sensitivity of the light detector.

6. A calibration reference light source according to claim 1, wherein the reference light emitter includes an integrating sphere having incident apertures for allowing the single-wavelength light to enter, respectively, and an exit aperture for allowing the single-wavelength reference light to exit by iterative reflection of the incident monochromatic light;
   the wavelength measuring unit measures the wavelengths of the single-wavelength light iteratively reflected by the integrating sphere, and
   the intensity measuring unit measures the intensities of the single-wavelength light iteratively reflected by the integrating sphere.

7. A calibration reference light source according to claim 2, wherein a relationship between the reference intensities at the reference wavelengths and the reference radiances of the reference light emitter is given by conversion coefficients, which are ratios of the reference radiances of the reference light emitter by the single-wavelength reference lights having basic wavelengths near the reference wavelengths to the reference intensities of the single-wavelength reference lights, and rates of change of the conversion coefficients in relation to wavelength changes of the single-wavelength reference lights.

8. A calibration reference light source according to claim 7, wherein:
   the monochromatic light sources are light emitting diodes, and the rates of the change of the conversion coefficients are given based on the single-wavelength reference lights emitted from the light emitting diodes operating at a plurality of different temperatures.

9. A calibration reference light source according to claim 7, wherein basic radiances of the reference light emitter are radiances obtained by converting output signals of a reference light detector having received the single-wavelength reference lights based on sensitivities at the reference wavelengths of the single-wavelength reference lights obtained from a known spectral sensitivity of the reference light detector, a distance of the reference light detector from the reference light emitter and an emitting area of the reference light emitter.

10. A sensitivity calibration system for a spectroradiometer, comprising a calibration reference light source and a spectroradiometer to be calibrated, wherein:
   the calibration reference light source includes:
   a plurality of monochromatic light sources for emitting reference lights having mutually different single-wavelengths;
   a reference light emitter for emitting the single-wavelength reference lights;
   a wavelength measuring unit for measuring the wavelengths of the single-wavelength reference lights as reference wavelengths;
   an intensity measuring unit for measuring the intensities of the single-wavelength reference lights as reference intensities; and
   a controller for successively turning the plurality of monochromatic light sources on for the radiation of the single-wavelength reference lights and calculating the reference radiances of the reference light emitter from the reference wavelengths and reference intensities of the single-wavelength reference lights measured by the wavelength measuring unit and the intensity measuring unit, and
   a spectral sensitivity change of the spectroradiometer to be calibrated is corrected based on differences between radiance measurement values calculated for the respective plurality of monochromatic reference lights by the spectroradiometer to be calibrated and reference radiances at reference wavelengths of the single-wavelength reference lights.

* * * * *